United States Patent [19]

Nishizawa

[11] 3,789,285

[45] Jan. 29, 1974

[54] POSITION CONTROL SYSTEM USING MAGNETIC FORCE

[75] Inventor: Junichi Nishizawa, Sendai, Japan

[73] Assignee: Handotai Kenkyu, Shinkokai, Miyagi-ken, Japan

[22] Filed: Mar. 27, 1972

[21] Appl. No.: 238,051

[52] U.S. Cl..................... 318/687, 310/12, 335/268
[51] Int. Cl. ........................................... G05b 11/00
[58] Field of Search 318/676, 687; 310/12; 335/266, 335/268, 281; 134/156; 323/89 MS, 92

[56] References Cited
UNITED STATES PATENTS

| | | | |
|---|---|---|---|
| 2,847,625 | 8/1958 | Popowsky | 318/676 |
| 2,876,404 | 3/1959 | Hannula | 318/687 |
| 2,412,247 | 12/1946 | Bohn | 335/281 |

Primary Examiner—J. D. Miller
Assistant Examiner—Harvey Fendelman
Attorney, Agent, or Firm—Robert E. Burns; Emmanuel J. Lobato

[57] ABSTRACT

The position control system using magnetic force, in which at least one pole of an electromagnet is opposed to a magnetic substance of a controlled object through an air gap therebetween so that a magnetic circuit including the magnetic substance, the air gap and the electromagnet is provided. The width of the air gap is preset to a value more than a predetermined width when the control current is zero. The controlled object is supported by at least one spring so as to be movable along a direction in which the magnetic force functions between the electromagnet and the magnetic substance. The control current of the electromagnet is controlled for adjusting the magnetic force and also a width of the air gap so as to obtain a desired position of the controlled object along the above mentioned direction. The magnetic flux density of the magnetic circuit substantially saturates at a condition where the air gap reaches a predetermined distance, while an elastic force of the spring is balanced with the magnetic force within the elastic region of the spring at the above-mentioned condition to avoid mutual collision between the controlled object and the electromagnet. The above mentioned principle can be modified for performing two or three dimensional control and rotation control for the controlled object.

26 Claims, 18 Drawing Figures

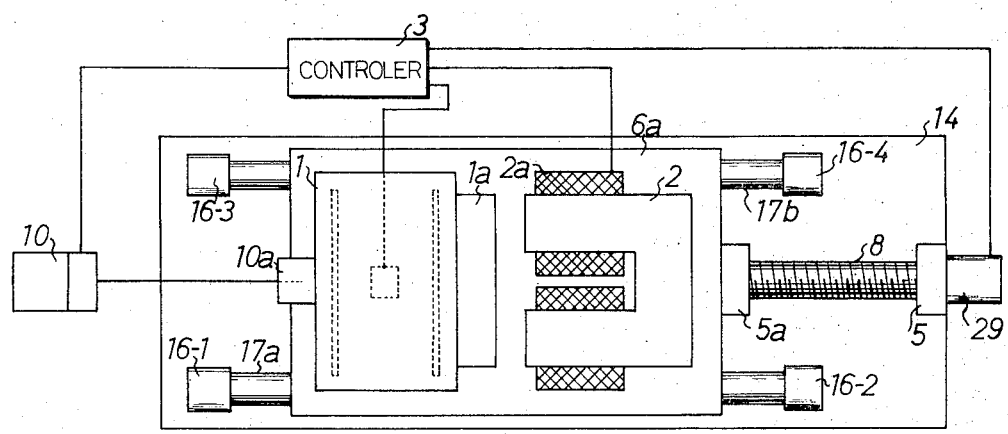
Fig. 12A
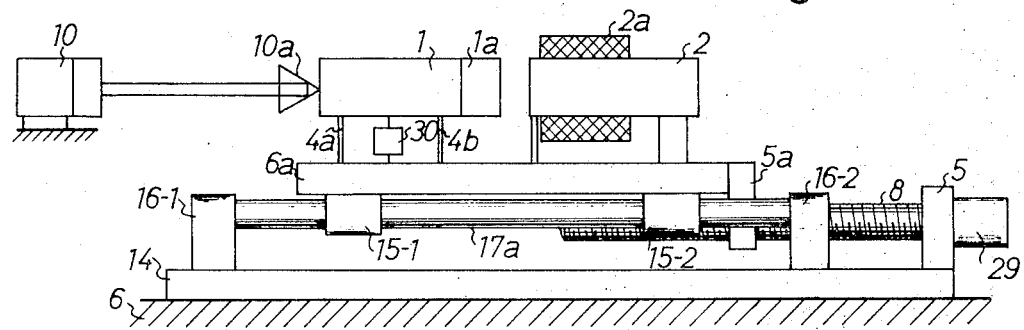
Fig. 12B
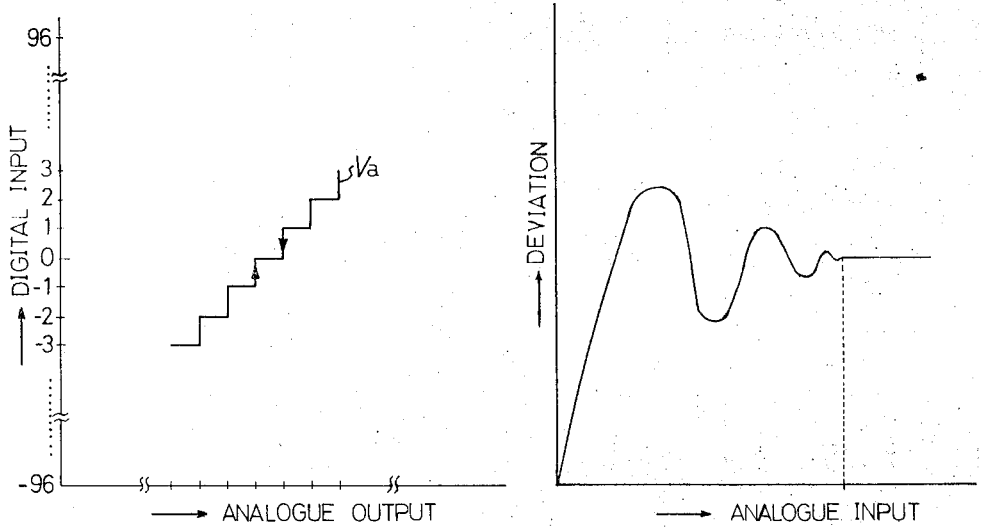
Fig. 13
Fig. 14

POSITION CONTROL SYSTEM USING MAGNETIC FORCE

This invention relates to a position control system and, more particularly, to a position control system using magnetic force.

Conventional position control for a controlled object is usually performed by screw mechanism. However, highly precise control cannot be performed by the screw control because of nonuniform friction between a male screw and a female screw, nonuniform pitch of the screw, and hysteresis of the screw etc. Accordingly, the conventional position control object cannot be applied to control a position of a control object, which must be controlled at highly precise order of control, such as control of a mask of a photo-etching device or an evaporative deposition by way of example. Moreover, two or three dimensional control of highly precise order is difficult by the conventional techniques.

An object of this invention is to provide a position control system capable of controlling a position of a controlled object at highly precise order of control by the use of magnetic force.

Another object of this invention is to provide a position control system capable of controlling a position of a controlled object at highly precise order of control in a two or three dimensional manner.

Another object of this invention is to provide a position control system capable of automatically controlling a position of a controlled object at highly precise order of control to a desired position.

In accordance with the principle of this invention, a controlled object or output member has connected thereto magnetic means including a magnetic substance. Electromagnetic means includes at least one pole of an electromagnet opposed to the magnetic substance of the controlled object through an air gap therebetween so that a magnetic circuit including the magnetic substance, the air gap and the electromagnet is provided. Preset means is provided for presetting the width of the air gap more than a predetermined width when the control current is zero. Mounting means is provided for mounting the controlled object so as to be movable from an initial position along a direction in which a magnetic force functions between the electromagnet and the magnetic substance. Biasing means are provided for developing a biasing force for continuously biasing the output member into the initial position, the biasing means including at least one spring. Control means coupled to the electromagnet is provided for controlling a control current of the electromagnet to adjust the magnetic force and also a width of the air gap so as to obtain a desired position of the controlled object along the above mentioned direction. The magnetic flux density of the magnetic circuit substantially saturates at a condition where the air gap reaches a predetermined distance, while an elastic force of the spring is balanced with the magnetic force within the elastic region of the spring at the above-mentioned condition to avoid mutual collision between the controlled object and the electromagnet. The above mentioned principle can be modified for performing two or three dimensional control and rotation control for a controlled object.

The principle, construction and operations of this invention will be better understood from the following detailed discussion taken in conjunction with the accompanying drawings, in which the same and equivalent parts are designated by the same reference numerals, characters and symbols, and in which:

FIGS. 12A and 12B are a plane view and a side view illustrating another embodiment of this invention in which coarse control and precise control are performed;

FIGS. 13 and 14 are wave forms explanatory of operations of the embodiment shown in FIG. 15.

Figure 3A:
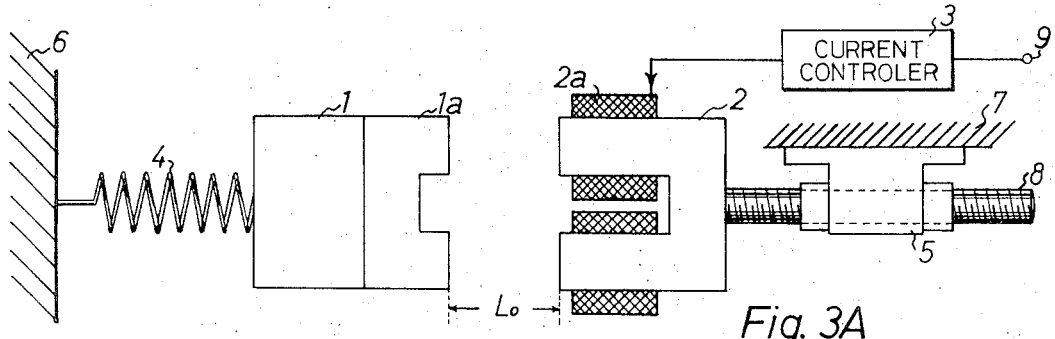
FIGS. 3A and 3B are side views explanatory of the principle of this invention.
Figure 3B:
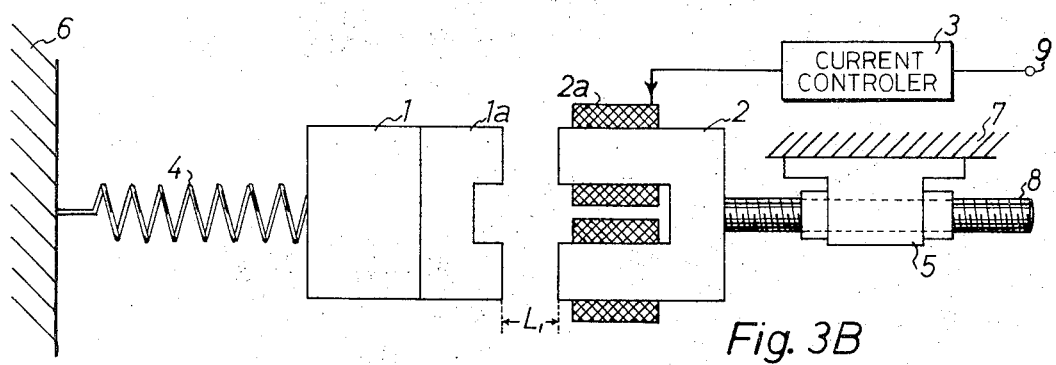

With reference to FIGS. 3A and 3B showing construction of the system of this invention, a controlled object 1 is partially or entirely made of a magnetic substance 1a. An electromagnet 2 comprising a u-shaped magnetic substance and a control winding 2a have two magnetic poles, which is opposed to the magnetic substance 1a of the control object through an air gap therebetween so that a magnetic circuit including the magnetic substance 1a, the air gap and the electromagnet 2 is provided. The electromagnet 2 is connected to a screw 8, which is coupled to a screwed supporter 5 fixed to a fixture 7. The screw 8 is so adjusted that the width of the air gap is more than a predetermined width $L_o$ when a control current of the electromagnet 2 is zero. A spring 4 fixed to a fixture 6 is connected to the controlled object 1, so that the controlled object is movable along a direction in which a magnetic attractive or rejective force functions between the electromagnet 2 and the magnetic substance 1a. A current controller 3 supplies a control current to the winding 2a in response to a control signal from a terminal 9, so that the control current of the electromagnet 2 is controlled for adjusting the magnetic force and also a width of the air gap so as to obtain a desired position of the controlled object 1 along the above mentioned direction.

Figure 1:
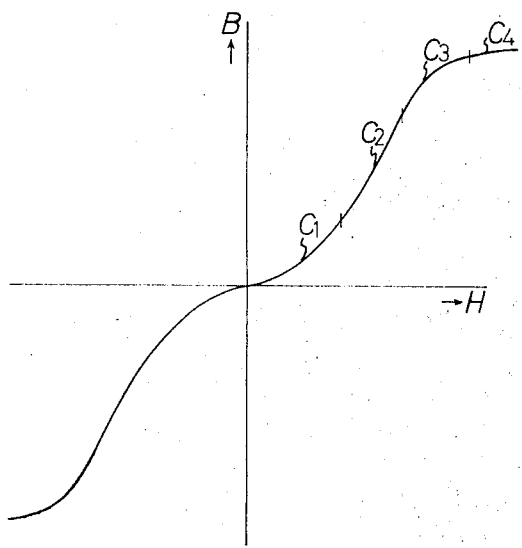
FIGS. 1 and 2 are characteristic curves explanatory of the principle of this invention.

In this case, the magnetic flux density of the magnetic circuit substantially saturates as shown in FIG. 1 at a condition where the air gap reaches a predetermined distance $L_1$, while an elastic force of the spring 4 is balanced with the magnetic force within the elastic region of the spring 4 at the above mentioned condition. As understood from FIG. 1, the magnetic flux density increases along sections $C_1$, $C_2$, $C_3$ and $C_4$ of a magnetic characteristic curve. Accordingly, the magnetic force between the magnetic substance $1a$ and the electromagnet 2 rapidly increases at the sections $C_1$ and $C_2$ but gradually increases at the sections $C_3$ and $C_4$. The gap between the magnetic substance $1a$ and the electromagnet 2 can be precisely controlled by utilizing the gentle slope of the section $C_4$. Moreover, since the elastic force of the spring 4 is balanced with the magnetic force generated by the magnetic flux of the magnetic circuit corresponding to the section $C_3$ or $C_4$, mutual collision between the controlled object 1 and the electromagnet 2 or between the controlled object 1 and the fixture 6 can be reliably avoided for both the attractive magnetic force and the rejective magnetic force.

Figure 2:
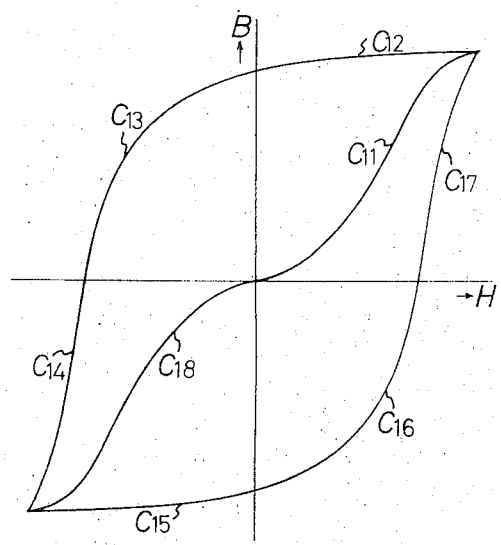

It is desirable to reduce control error that the magnetic substance ($1a$, 2) of the magnetic circuit have not a magnetic hysteresis characteristic ($C_{12} - C_{13} - C_{14} - C_{15} - C_{16} - C_{17}$) but have a non-hysteresis characteristic ($C_{11}$, $C_{18}$), such as soft iron, as shown in FIG. 2.

The two poles of the electromagnet 2 are opposed to the magnetic substance $1a$ in FIGS. 3A and 3B. However, only one pole of a bar-shaped electromagnet may be opposed to the magnetic substance $1a$. Other electromagnets, such as an E-shaped electromagnet, may be also employed as the electromagnet 2.

Figure 4A:
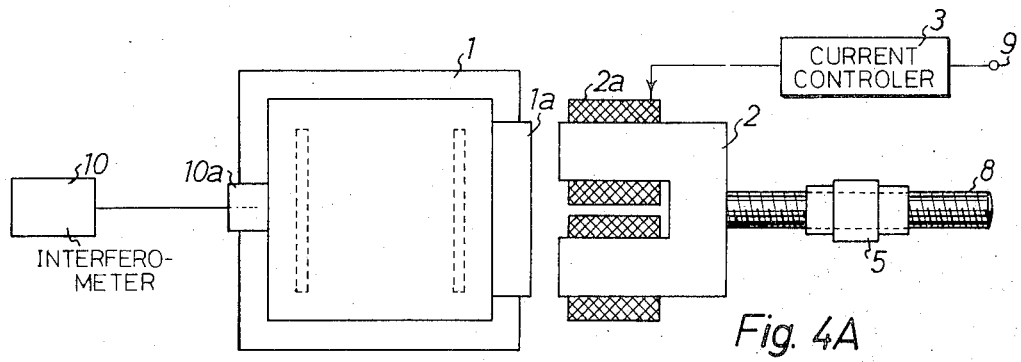
FIGS. 4A and 4B are a plane view and a side view illustrating an embodiment of this invention.
Figure 4B:
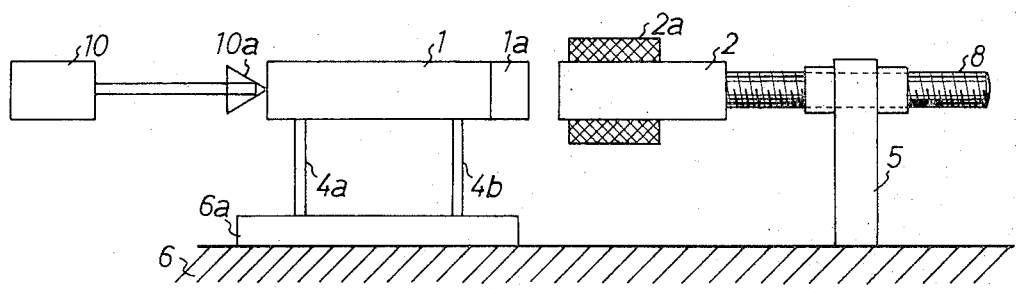

With reference to FIGS. 4A and 4B showing an embodiment of this invention, the controlled object 1 is supported by a pair of plate springs $4a$ and $4b$, which are arranged in parallel with each other and at right angles with the movable direction of the controlled object in which a magnetic force functions between the electromagnet 2 and the magnetic substance $1a$. One edge of each of the plate springs $4a$ and $4b$ is coupled to the controlled object 1 while each the other edges of the plate springs $4a$ and $4b$ is fixed to a fixing plate $6a$ on a fixture 6. An interferometer 10 measures a position of the controlled object 1 in combination with a prism $10a$, which is fixed to the controlled object $10a$.

Figure 5:
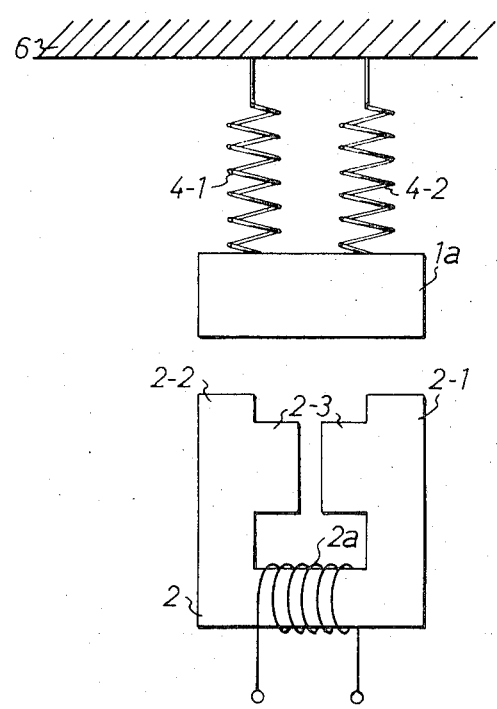
FIG. 5 is an elevation explanatory of another embodiment of this invention.

The above mentioned electromagnet 2 may be further provided with at least one pair of auxiliary magnetic poles 2-3 in addition to the usual magnetic poles 2-1 and 2-2 as shown in FIG. 5. The auxiliary magnetic poles 2-3 are opposed to each other through an air gap having a magnetic resistance less than that of the air gap between the magnetic substance $1a$ and the magnetic poles 2-1 and 2-2 of the electromagnet 2. Accordingly, the magnetic flux of the magnetic circuit formed by the magnetic substance $1a$, the air gap and the electromagnet 2 leakages through the auxiliary magnetic poles 2-3 before the magnetic flux density of the magnetic circuit completely saturates. As a result of the above principle, a position of the controlled object $1a$ supported by two spring 4-1 and 4-2 is controlled in response to control of a control current of the winding $2a$ of the electromagnet 2 without mutual collision between the controlled object 1 and electromagnet 2.

Figure 6:
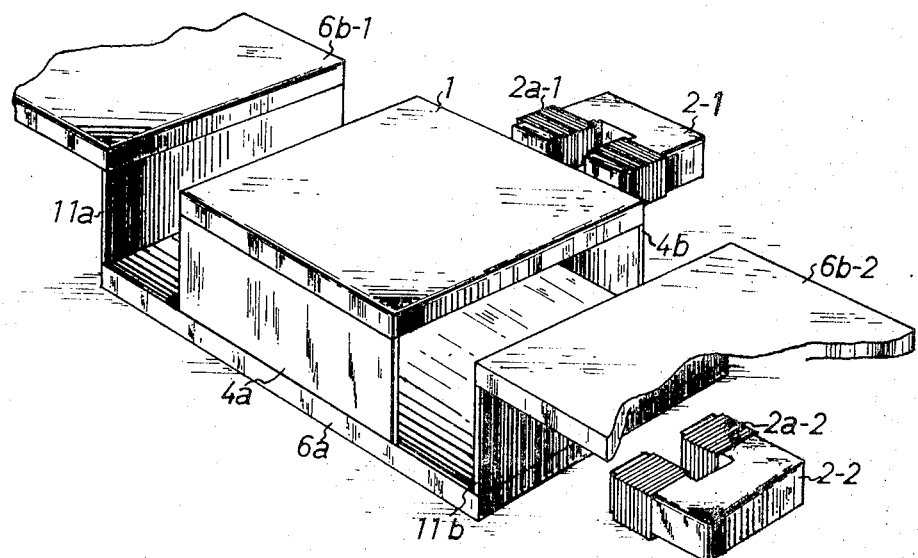
FIG. 6 is a perspective view illustrating another embodiment of this invention in which two dimentional control is performed.

With reference to FIG. 6, an embodiment of this invention is provided for performing two dimensional position control. In this embodiment, a second electromagnet 2-2 having a second winding $2a$ -2 is further provided in addition to a first electromagnet 2-1 having a first electromagnet $2a$-1. The first electromagnet 2-1, controls the controlled object 1, which is supported on a supporting plate $6a$ by a pair of parallel plate spring $4a$ and $4b$. The supporting plate $6a$ is supported to fixtures $6b$-1 and $6b$-2 by a pair of parallel plate springs $11a$ and $11b$. A first direction of a first magnetic force acting between the first electromagnet 2-1 and the magnetic substance of the controlled object 1 intersects at right angles with a second direction of a second magnetic force acting between the second electromagnet 2-2 and the magnetic substance of the supporting plate $6a$. The operations of this embodiment will be readily understood from the above mentioned principle, so that details are omitted.

Figure 7:
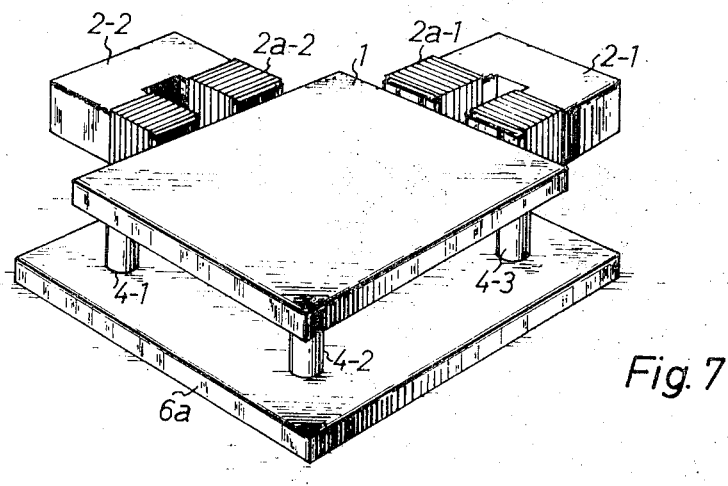
FIG. 7 is a perspective view illustrating another embodiment of this invention in which two dimentional control is performed.

With reference to FIG. 7, another embodiment of this invention is provided for performing two dimensional position control. In this embodiment, two pairs of bar springs 4-1, 4-2, 4-3 and 4-4 are arranged in parallel with one another and fixed on a fixing plate $6a$ so as to fixedly support a controlled object 1. A first electromanget 2-1 and a second electromagnet 2-2 control independently the controlled object 1. Since the operations of this embodiment will be readily understood from the above mentioned principle, details are omitted.

Figure 8:
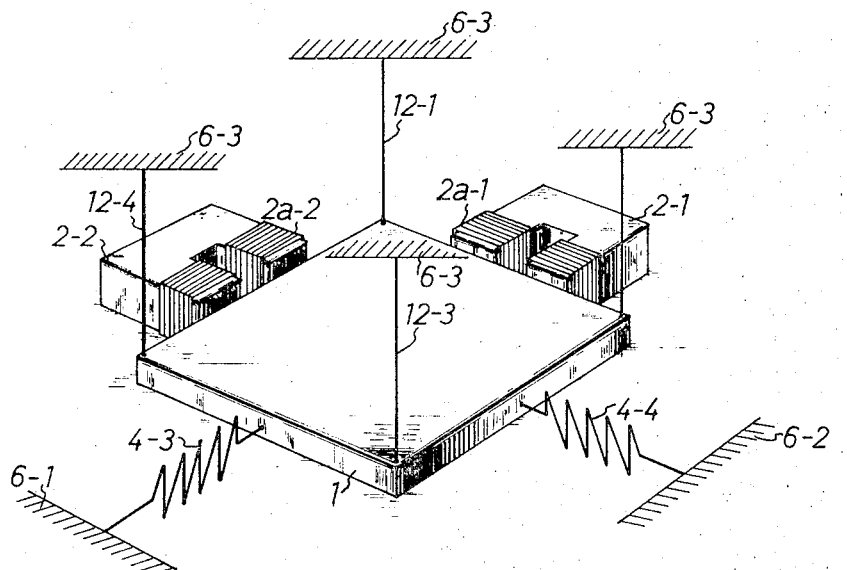
FIG. 8 is a perspective view illustrating another embodiment of this invention in which two dimensional control is performed.

With reference to FIG. 8, another embodiment of this invention is provided for performing two dimentional position control. In this embodiment, two pairs of non-elastic ropes 12-1, 12-2, 12-3 and 12-4 connected to fixtures 6-3 are employed to hold four corners of a control object 1. Two coil springs 4-3 and 4-4 are respectively connected between a fixture 6-1 and the control object 1 and between a fixture 6-2 and the control object 1 so as to balance with magnetic forces of the first electromagnet 2-1 and the second electromagnet 2-2. Since operations of this embodiment can be readily understood from the above principle, details are omitted.

Figure 9:
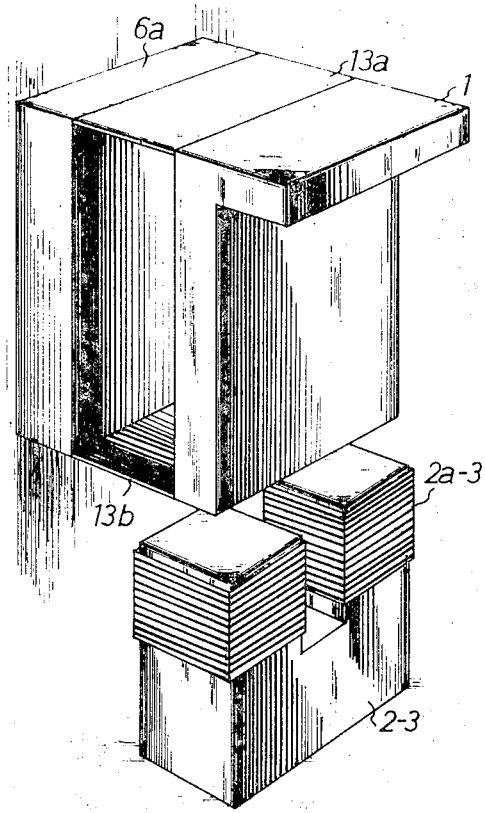
FIG. 9 is a perspective view illustrating another embodiment of this invention in which one dimensional control along a vertical direction is performed.

If a position of a control object 1 is controlled in a vertical direction, the control object 1 is supported as shown in FIG. 9 for example by a pair of parallel plate springs $13a$ and $13b$, which are arranged perpendicularly with the vertical direction and fixed to a fixture $6a$.

Figure 10:
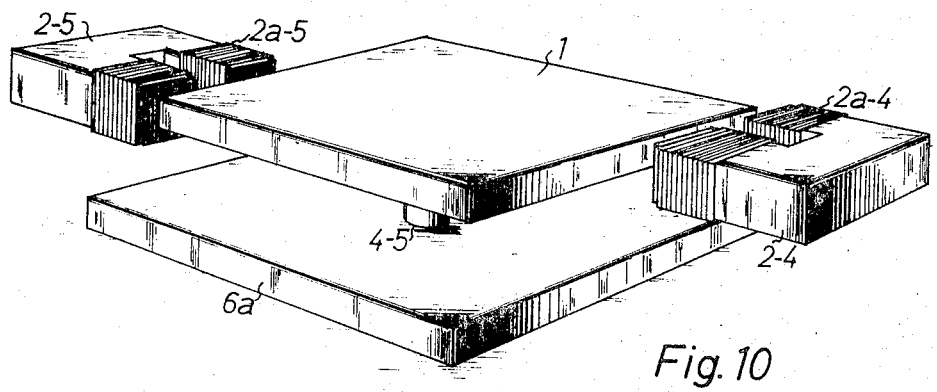
FIG. 10 is a perspective view illustrating another embodiment of this invention in which rotation control is performed.

With reference to FIG. 10, an embodiment of this invention is provided for performing rotation control of a controlled object 1. In this invention, the controlled object 1 is supported by a torshion spring 4-5, which is fixed between the control object 1 and a fixing plate $6a$. An electromagnet 2-4 and an electromagnet 2-5 are provided to rotate the control object 1 with respect to the fixing point of the torshion spring 4-5. One of the electromagnets 2-4 and 2-5 may be eliminated, however two electromagnets 2-4 and 2-5 are desirable to completely perform rotation control without shift of the position of the control object 1.

Figure 11:
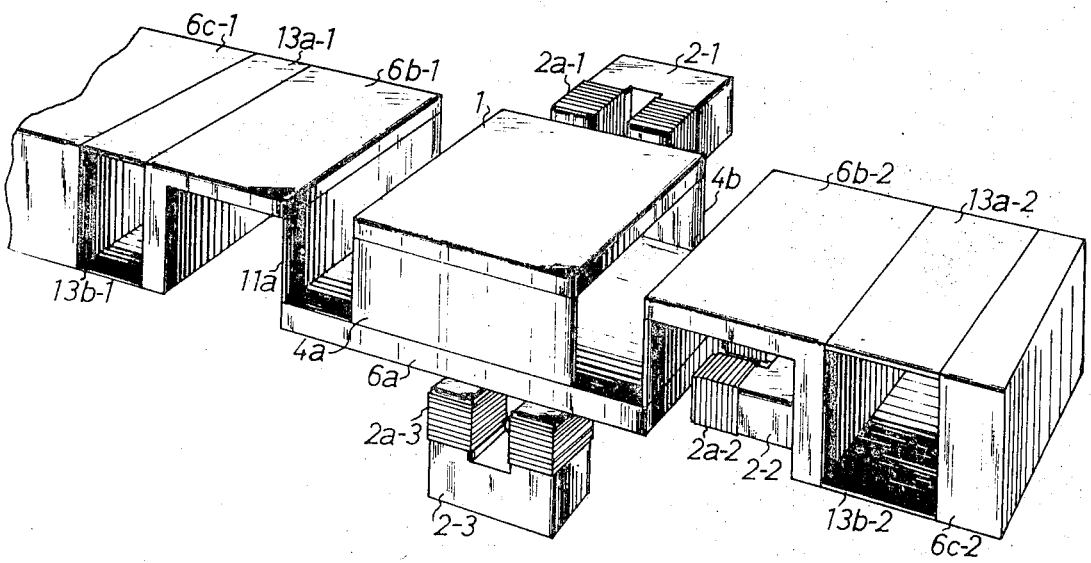
FIG. 11 is a perspective view illustrating another embodiment of this invention in which three dimentional control is performed.

With reference to FIG. 11, another embodiment of this invention is provided for performing three dimensional position control. This embodiment is substantially a combination of an embodiment shown in FIG. 6 and an embodiment shown in FIG. 9. In other words, supporting plates $6b$-1 and $6b$-2 are further supported by fixtures $6c$-1 and $6c$-2 through two pair of parallel spring plates ($13a$-1, $13b$-1) and ($13a$-2, $13b$-2) respectively. The electromagnets 2-2 and 2-3 are positioned so as to control the position of the supporting plate $6a$. The three dimentional control is performed by independently controlling the three electromagnets 2-1, 2-2 and 2-3.

With reference to FIGS. 12A and 12B, another embodiment of this invention is provided for performing coarse position control and precise position control of a controlled object 1. In this embodiment, slide bushes 15-1, 15-2, 15-3 and 15-4 of a supporting plate 6a are slidably coupled to a pair of parallel sliding guides 17a and 17b, which are supported by supporting bases 16-1, 16-2, 16-3 and 16-4. A screwed nut 5a connected to the supporting plate 6a is coupled to a driving screw 8, which is driven by a motor 29. If the motor 29 is driven by a control current from a controller 3, the position of the controlled object 1 is controlled in a coarse manner while precise position control is performed by the control of the electromagnet 2 on the supporting plate 6a as described above. The controller 3 is controlled by the output of a speed detector 30 as mentioned below.

Figure 15:
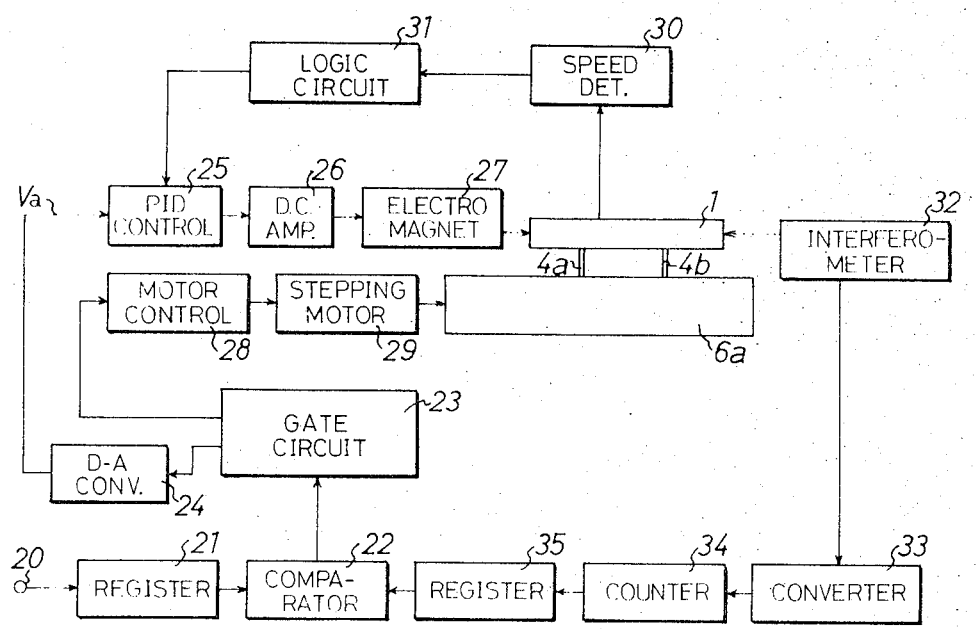
FIG. 15 is a block diagram illustrating an embodiment of this invention in which automatic control is performed.

With reference to FIG. 15, another embodiment of this invention is provided for automatically performing the position control of a controlled object 1, which is supported by a supporting plate 6a through a pair of plate springs 4a and 4b. A control code unit is preset through an input terminal 20 to a register 21. An interferometer 32 detects a position of the control object 1 with respect to a reference position. A detected output of the interferometer 32 is applied to a converter 33, in which the detected output is converted to pulses. The number of pulses represents a level of the detected output of the interferometer 32. A counter 34 is a reversible counter, which counts the output pulses of the converter 33 with reference to the polarity of the detected output of the interferometer 32. The counting state of the counter 34 is then stored in a register 35. A comparator 22 compares contents of the registers 21 and 35, so that a control code indicative of a difference between contents of the registers 21 and 35 is applied to a gate circuit 23. Upper digits of the control code control a stepping motor 29 through a motor control 28 to perform coarse control of the supporting plate 6a. A lowest digit of the control code is converted to an analogue control signal at a D-A converter 24 when the upper digits become zero as mentioned below. The analogue control signal is applied, through a PID control 25 and a dc amplifier 26, to an electromagnet 27 to perform precise position control of a controlled object 1. A speed detector 30 detects a travelling speed of the controlled object 1 and controls the PID control 25 through a logic circuit 31 to accelerate establishing of the controlled object 1 to a controlled position.

As a result of the above construction, the position of the supporting plate 6a is at first controlled by the upper digits of the control code of the comparator 22. After the upper digits from the control code assume zero, the lowest digit of the control code controls the PID control 25 so that the lowest digit is reduced to zero as shown in FIG. 13 by arrows. In response to the application of the lowest digit to the PID control 25, the position of the controlled object 1 is controlled on the supporting plate 6a as shown in FIG. 14. Accordingly, the position of the controlled object 1 is automatically controlled to a desired position indicated by the control code unit from the terminal 20.

The above mentioned automatic control can be also applied to the above mentioned two and three dimentional control and rotation control.

Moreover, many other combination of control, such as a combination of one dimentional control and rotation control, can be provided in accordance with this invention.

Furthermore, if an auxiliary electromagnet is provided for each of the above mentioned electromagnet so that one is controlled in a rapidly changed section $C_1$ or $C_2$ and the other is controlled in a gentle section $C_3$ or $C_4$ in a characteristic curve shown in FIG. 1, coarse control can be also carried out by an electromagnet in exchange for screw control in the embodiment shown in FIGS. 12A, 12B and 15.

What I claim is:

1. A position control system using magnetic force, comprising: a controlled object having one portion composed of a magnetic substance; an electromagnet responsive to a control current applied thereto for developing a magnetic field and having at least one pole opposed to the magnetic substance of said controlled object and spaced therefrom to define an air gap therebetween, whereby the magnetic substance, the air gap and the electromagnet define a magnetic circuit having a magnetic flux density and which develops a magnetic force proportional to said magnetic field; preset means for presetting the width of said air gap to a distance greater than a predetermined width when the magnitude of said control current is zero; mounting means mounting said controlled object for movement along one axis and including at least one spring for developing an elastic force opposing said magnetic force; and control means coupled to said electromagnet for controlling the magnitude of said control current of said electromagnet to selectively adjust said magnetic force to effect the movement of said controlled object along said axis, whereby the position of said controlled object is varied to reach a selected position along said one axis in response to controlled adjustments to said control current and the operable range of said movement is defined by the magnetic flux of said magnetic circuit which substantially saturates when said air gap reaches a predetermined distance thereby defining a maximum magnetic force balanced with said elastic force developed by said spring.

2. A position control system according to claim 1, in which said electromagnet has a plurality of poles disposed in a line and comprises a U-shaped magnetic substance having no hysteresis magnetic characteristic and a control coil wound on said U-shaped magnetic substance, the two poles of said U-shaped magnetic substance being opposed to said magnetic substance of said controlled object.

3. A position control system according to claim 2, in which said electromagnet has at least one pair of auxiliary magnetic poles spaced from each other to define an air gap therebetween having a magnetic resistance less than that of said air gap between said magnetic substance and said electromagnet, thereby effecting the leakage of the magnetic flux of said magnetic circuit before the magnetic flux density of said magnetic circuit completely saturates.

4. A position control system according to claim 1, in which said mounting means comprises a fixed base and a pair of plate springs disposed in parallel with each other and at right angles to said axis, and in which one edge of each of said plate springs is coupled to said controlled object and the other edge of each of said plate springs is fixed to said fixed base.

5. A position control system according to claim 1, further comprising measuring means for measuring the distance between said controlled object and a refernce position, conversion means coupled to said measuring means for converting the measured distance to a controlled digital value, input means for temporarily storing an input digital value representative of said desired position of said controlled object, a comparator coupled to said conversion means and said input means for producing a difference value equal to the difference between said controlled digital value and said input digital value, means coupled to said comparator and said control means for controlling said control means to vary said control current in response to said difference value to reduce the difference to zero.

6. A position control system using magnetic force, comprising: a controlled object having one portion composed of a magnetic substance; a first electromagnet responsive to a first control current applied thereto for developing magnetic flux and having at least one pole opposed to the magnetic substance of said controlled object and spaced therefrom to define a first air gap therebetween whereby said magnetic substance, said first air gap and said first electromagnet define a first magnetic circuit having a magnetic flux density controlled by said first control current and developing a first magnetic force having a magnitude proportional to the magnitude of said first control current; a second electromagnet responsive to a second control current applied thereto for developing magnetic flux and having at least one pole opposed to the magnetic substance of said controlled object and spaced therefrom to define a second air gap therebetween, whereby said magnetic substance, said second air gap and said second electromagnet define a second magnetic circuit having a magnetic flux density controlled by said second control current and developing a second magnetic force having a magnitude proportional to the magnitude of said second control current; first presetting means for presetting the width of said first air gap to a distance greater than a first predetermined width when the magnitude of said first control current of the first electromagnet is equal to zero; second presetting means for presetting the width of said second air gap to a distance greater than a second predetermined width when the magnitude of said second control current of the second electromagnet is equal to zero; mounting means mounting said controlled object for movement along two orthogonal axes and including at least two springs connected to said controlled object developing elastic forces opposing said magnetic forces; first control means coupled to said first electromagnet for controlling the magnitude of said first control current of said first electromagnet to selectively adjust said first magnetic force to effect movement of said controlled object along one axis whereby the position of said controlled object is varied to reach a selected position along said one axis in response to controlled adjustments to said first control current and the operable range of said movement is defined by the magnetic flux density of said first magnetic circuit which substantially saturates when said first air gap reaches a predetermined first distance thereby defining a first maximum magnetic force balanced with said elastic force developed by one of said two springs; and second control means coupled to said second electromagnet for controlling the magnitude of said second control current of said second electromagnet to selectively adjust said second magnetic force to effect movement of said controlled object along the other axis whereby the position of said controlled object is varied to reach a desired position along said other axis in response to controlled adjustments to said second control current and the operable range of said movement is defined by the magnetic flux density of said second magnetic circuit which substantially saturates when said second air gap reaches a predetermined second distance thereby defining a second maximum magnetic force balanced with said elastic force developed by the other of said two springs.

7. A position control system according to claim 6, in which said first electromagnet and said second electromagnet each have a plurality of poles disposed in a line and comprising a U-shaped magnetic substance having two poles and having no hysteresis magnetic characteristic and a control coil wound on said U-shaped magnetic substance, the two poles of said U-shaped magnetic substance being o-posed to said magnetic substance of the controlled object.

8. A position control system according to claim 7, in which said first and second electromagnets each have at least one pair of opposed magnetic poles spaced from each other to define an air gap therebetween having a magnetic resistance less than that of each of said first and second air gaps, thereby effecting the leakage of the magnetic flux of each of said first magnetic circuit and said second magnetic circuit before the magnetic flux density of corresponding one of said first magnetic circuit and said second magnetic circuit completely saturates.

9. A position control system according to claim 6, in which said mounting means comprises a movable supporting plate, a fixed base, two pairs of plate springs, one pair of said plate springs disposed in parallel with each other and at right angles to said one axis, the other pair of said plate springs disposed in parallel with each other and at right angles to said other axis, one pair of said plate springs having one edge of each spring coupled to said controlled object and having the other edge of each spring coupled to said movable supporting plate and the other pair of said plate springs having an edge of each spring coupled to said movable supporting plate and having the other edge of said other pair of said plate springs fixed to said fixed base.

10. A position control system according to claim 6, in which said mounting means comprises a fixed base, two pair of bar springs disposed in parallel and having one end of each of said bar springs coupled to said controlled object and having the other end of said bar springs fixed to said fixed base.

11. A position control system according to claim 6, in which said mounting means comprises a fixed base, two pair of non-elastic ropes having one end of each connected to said fixed base and the other ends connected to said controlled object, and two coil springs one connected between said controlled object and said fixed base to resist motion along said one axis and the other between said controlled object and said fixed base to resist motion along said other axis.

12. A position control system according to claim 6, further comprising for each electromagnet, means for measuring the distance between said controlled object and a reference position, conversion means coupled to said means for measuring for converting the measured distance to a controlled digital value, input means for temporarily storing an input digital value representative of said desired position of said controlled object, a comparator coupled to said conversion means and said input means for producing a difference value equal to the difference between said controlled digital value and said input digital value, means coupled to said comparator and the corresponding one of said control means for controlling said control means to vary said control current in response to said difference value to reduce the difference value to zero.

13. A position control system using magnetic force, comprising: a controlled object having one portion composed of a magnetic substance; a first electromagnet responsive to a first control current applied thereto for developing magnetic flux and having at least one pole opposed to the magnetic substance of said controlled object and spaced therefrom to define a first air gap therebetween whereby said magnetic substance, said first air gap and said first electromagnet define a first magnetic circuit having a magnetic flux density controlled by said first control current and developing a first magnetic force having a magnitude proportional to the magnitude of said first control current; a second electromagnet responsive to a second control current applied thereto for developing magnetic flux and having at least one pole opposed to the magnetic substance of said controlled object and spaced therefrom to define a second air gap therebetween whereby said magnetic substance, said second air gap and said second electromagnet define a second magnetic circuit having a magnetic flux density controlled by said second control current and developing a second magnetic force having a magnitude proportional to the magnitude of said second control current; a third electromagnet responsive to a third control current applied thereto for developing magnetic flux and having at least one pole opposed to the magnetic substance of said controlled object and spaced therefrom to define a third air gap therebetween whereby said magnetic substance, said third air gap and said third electromagnet define a third magnetic circuit having a magnetic flux density controlled by said third control current and developing a third magnetic force having a magnitude proportional to the magnitude of said third control current; first presetting means for presetting the width of said first air gap to a distance greater than a first predetermined width when the magnitude of said first control current of the first electromagnet is equal to zero; second presetting means for presetting the width of said second air gap to a distance greater than a second predetermined width when the magnitude of said second control current of the second electromagnet is equal to zero; third presetting means for presetting the width of said third air gap to a distance greater than a third predetermined width when the magnitude of said third control current of the third electromagnet is equal to zero; mounting means mounting said controlled object for movement along three orthogonal axes and including at least three springs connected to said controlled object developing elastic forces opposing said magnetic forces; first control means coupled to said first electromagnet for controlling the magnitude of said first control current of said first electromagnet to selectively adjust said first magnetic force to effect movement of said controlled object along a first axis whereby the position of said controlled object is varied to reach a selected position along said first axis in response to controlled adjustments to said first control current and the operable range of said movement is defined by the magnetic flux density of said first magnetic circuit which substantially saturates when said first air gap reaches a predetermined first distance thereby defining a first maximum magnetic force balanced with said elastic force developed by a first one of said three springs; and second control means coupled to said second electromagnet for controlling the magnitude of said second control current of said second electromagnet to selectively adjust said second magnetic force to effect movement of said controlled object along a second axis whereby the position of said controlled object is varied to reach a desired position along said second axis in response to controlled adjustments to said second control current and the operable range of said movement is defined by the magnetic flux density of said second magnetic circuit which substantially saturates when said second air gap reaches a predetermined second distance thereby defining a second maximum magnetic force balanced with said elastic force developed by a second one of said three springs; and third control means coupled to said third electromagnet for controlling the magnitude of said third control current of said third electromagnet to selectively adjust said third magnetic force to effect movement of said controlled object along a third axis whereby the position of said controlled object is varied to reach a desired position along said third axis in response to controlled adjustments to said third control current and the operable range of said movement is defined by the magnetic flux density of said third magnetic circuit which substantially saturates when said third air gap reaches a predetermined third distance thereby defining a third maximum magnetic force balanced with an elastic force developed by the third of said three springs.

14. A position control system according to claim 13, in which said first electromagnet, said second electromagnet and said third electromagnet each have a plurality of poles disposed in a line and each comprises a U-shaped magnetic substance having two poles and having no hysteresis magnetic characteristic and a control coil wound on said U-shaped magnetic substance, the two poles of said U-shaped magnetic substance being opposed to said magnetic substance of the controlled object.

15. A position control system according to claim 14, in which said first, second and third electromagnets each have at least one pair of opposed magnetic poles spaced from each other to define an air gap therebetween having a magnetic resistance less than each of said first, second and third air gaps, thereby effecting the leakage of the magnetic flux of each of said first magnetic circuit, said second magnetic circuit and said third magnetic circuit before the magnetic flux density of the corresponding one of said first magnetic circuit, said second magnetic circuit and said third magnetic circuit completely saturates.

16. A position control system according to claim 13, in which said mounting means comprises first and second movable supporting plates, a fixed base, three pairs of plate springs, a first pair of said plate springs disposed in parallel with each other and at right angles with said first axis, a second pair of said plate springs disposed in parallel with each other and at right angles with said second axis, and a third pair of said plate springs disposed in parallel with each other and at right angles with said third axis, wherein one edge of each of said first pair of said plate springs is coupled to said controlled object and the other edge of each of said first pair of said plate springs is coupled to said first movable supporting plate, one edge of each of said second pair of said plate springs is coupled to said first movable supporting plate and other edge of each of said second pair of said plate springs is coupled to said second movable supporting plate, and one edge of each of said third pair of said plate springs is coupled to said second movable supporting plate and the other edge of said third pair of said plate springs is fixed to said fixed base.

17. A position control system according to claim 13, further comprising for each electromagnet, means for measuring the distance between said controlled object and a reference position, conversion means coupled to said means for measuring for converting the measured distance to a controlled digital value, input means for temporaily storing an input digital value representative of said desired position of said controlled object, a comparator coupled to said conversion means and said input means for producing a difference value equal to the difference between said controlled digital value and said input digital value, means coupled to said comparator and the corresponding one of said control means for controlling said control means to vary said control current in response to said difference value to reduce the difference value to zero.

18. A position control system using magnetic force, comprising: a controlled object having one portion composed of a magnetic substance; at least one electromagnet responsive to a control current supplied thereto for developing magnetic flux and having at least one pole opposed to the magnetic substance of said controlled object and spaced therefrom to define an air gap therebetween whereby said magnetic substance, said air gap and said electromagnet define a magnetic circuit having a magnetic flux density controlled by said control current and developing a magnetic force having a magnitude proportional to the magnitude of said control current; presetting means for presetting the width of said air gap to a distance greater than a predetermined width when the magnitude of said control current is equal to zero; mounting means mounting said controlled object for rotatable movement about one axis and including a torsion spring connected to said controlled object developing a torsioned stress opposing said magnetic force; and control means coupled to said electromagnet for controlling the magnitude of said control current of said electromagnet to selectively adjust said magnetic force to effect movement of said controlled object about said axis whereby the position of said controlled object is varied to reach a selected position about said axis in response to controlled adjustments to said first control current and the operable range of said movement is defined by the magnetic flux density of said magnetic circuit which substantially saturates when said air gap reaches a predetermined distance thereby defining a maximum magnetic force balanced with said torsional stress developed by said torsion spring.

19. A position control system according to claim 18, in which said electromagnet has a plurality of poles disposed in a line and comprising a U-shaped magnetic substance having two poles and having no magnetic hysteresis characteristic and a control coil wound on said U-shaped magnetic substance, the two poles of said U-shaped magnetic substance being opposed to said magnetic substance of the controlled object.

20. A position control system according to claim 19, in which said electromagnet has at least one pair of opposed magnetic poles spaced from each other to define an air gap therebetween having a magnetic resistance less than that of said air gap, thereby effecting the leakage of the magnetic flux of said magnetic circuit before the magnetic flux density of said magnetic circuit completely saturates.

21. A position control system according to claim 18, further comprising, means for measuring the distance between said controlled object and a reference position, conversion means coupled to said means for measuring for converting the measured distance to a controlled digital value, input means for temporarily storing an input digital value representative of said desired position of said controlled object, a comparator coupled to said conversion means and said input means for producing a difference value equal to the difference between said controlled digital value and said input digital value, means coupled to said comparator and the corresponding one of said control means for controlling said control means to vary said control current in response to said difference value to reduce the difference value to zero.

22. A position control system utilizing a variable magnitude magnetic field to effect the selective positioning of an output member to which an object to be controlled is connected during use of the system, said system comprising: electromagnetic means responsive to an electric potential applied thereto for developing a magnetic field having a magnitude proportional to the magnitude of said electric potential and a polarity dependent upon the polarity of said electric potential; an output member spaced from said electromagnetic means; means mounting said output member for at least one degree of freedom of movement with respect to an initial position; biasing means developing a biasing force for continuously biasing said output member into said initial position; magnetic means connected to said output member and coacting with said magnetic field for developing a magnetic force having a magnitude proportional to the magnitude of said magnetic field for overcoming said biasing force to move said output member within said one degree of freedom from said initial position, said magnetic means comprising a magnet having a fixed magnetic field coacting with said magnetic field to develop a magnetic force having a direction dependent upon the polarity of said magnetic field; and control means for variably adjusting the magnitude of said electric potential to adjust the magnitude of said magnetic field thereby adjusting the magnitude of said magnetic force to adjustably move said output member within said one degree of freedom from said initial position to effect the selective positioning of said output member within said one degree of freedom.

23. A position control system according to claim 22, further comprising means mounting said electromagnetic means for adjustable movement within said one degree of freedom 24. A position control system utilizing a variable magnitude magnetic field to effect the selective positioning of an output member to which an object to be controlled is connected during use of the system, said system comprising: electromagnetic means responsive to an electric potential applied thereto for developing a magnetic field having a magnitude proportional to the magnitude of said electric potential, said electromagnetic means having a flux density characteristic and developing a maximum magnetic force corresponding to a state of saturated flux density; an output member spaced from said electromagnetic means; means mounting said output member for at least one degree of freedom of movement with respect to an initial position; biasing means developing a biasing force proportional to the distance of said output member from said initial position for continuously biasing said output member into said initial position, whereby one extreme position of said output member is defined as the position of said output member for said biasing force to equal said maximum magnetic force; magnetic means connected to said output member and coacting with said magnetic field for developing a magnetic force having a magnitude proportional to the magnitude of said magnetic field for overcoming said biasing force to move said output member within said one degree of freedom from said initial position; and control means for variably adjusting the magnitude of said electric potential to adjust the magnitude of said magnetic field thereby adjusting the magnitude of said magnetic force to adjustably move said output member within said one degree of freedom from said initial position to effect the selective positioning of said output member within said one degree of freedom.

25. A position control system according to claim 24, wherein said output member is spaced from said electromagnetic means at a distance greater than the distance between said initial position and said one extreme position.

26. A position control system according to claim 24, further comprising means mounting said electromagnetic means for adjustable movement within said one degree of freedom.

* * * * *